United States Patent [19]
Boudot

[11] Patent Number: 5,256,852
[45] Date of Patent: Oct. 26, 1993

[54] PROCESS AND DEVICE FOR LASER WORKING WITH REMOTE CONTROL

[75] Inventor: Cécile Boudot, Chalons Sur Saone, France

[73] Assignee: Framatome, Courbevoie, France

[21] Appl. No.: 774,357

[22] Filed: Oct. 10, 1991

[30] Foreign Application Priority Data

Oct. 10, 1990 [FR] France ............................... 9012515

[51] Int. Cl.$^5$ ............................................. B23K 26/02
[52] U.S. Cl. ........................... 219/121.83; 219/121.63; 219/121.64
[58] Field of Search ...................... 219/121.83, 121.84, 219/121.63, 121.64, 121.68, 121.69

[56] References Cited

U.S. PATENT DOCUMENTS

| | | | |
|---|---|---|---|
| 4,790,651 | 12/1988 | Brown et al. | 356/45 |
| 4,873,414 | 10/1989 | Ma et al. | 219/121.7 |
| 4,918,284 | 4/1990 | Weisz | 219/121.78 |
| 4,978,834 | 12/1990 | Griffaton | 219/121.63 |
| 5,155,329 | 10/1992 | Terada et al. | 219/121.83 |

FOREIGN PATENT DOCUMENTS 0195825 2/1985 European Pat. Off. .
0331891 9/1989 European Pat. Off. .

OTHER PUBLICATIONS

IBM Technical Disclosure Bulletin-vol. 26 No. 6-Nov. 1983.

*Primary Examiner*—C. L. Albritton
*Attorney, Agent, or Firm*—Pollock, Vande Sande & Priddy

[57] ABSTRACT

A laser beam (2) is carried to the vicinity of a working point (10), on which it is focused, and spectral analysis of the light emitted at the working point during the laser working is carried out. Application to laser welding in small diameter tubes.

7 Claims, 1 Drawing Sheet

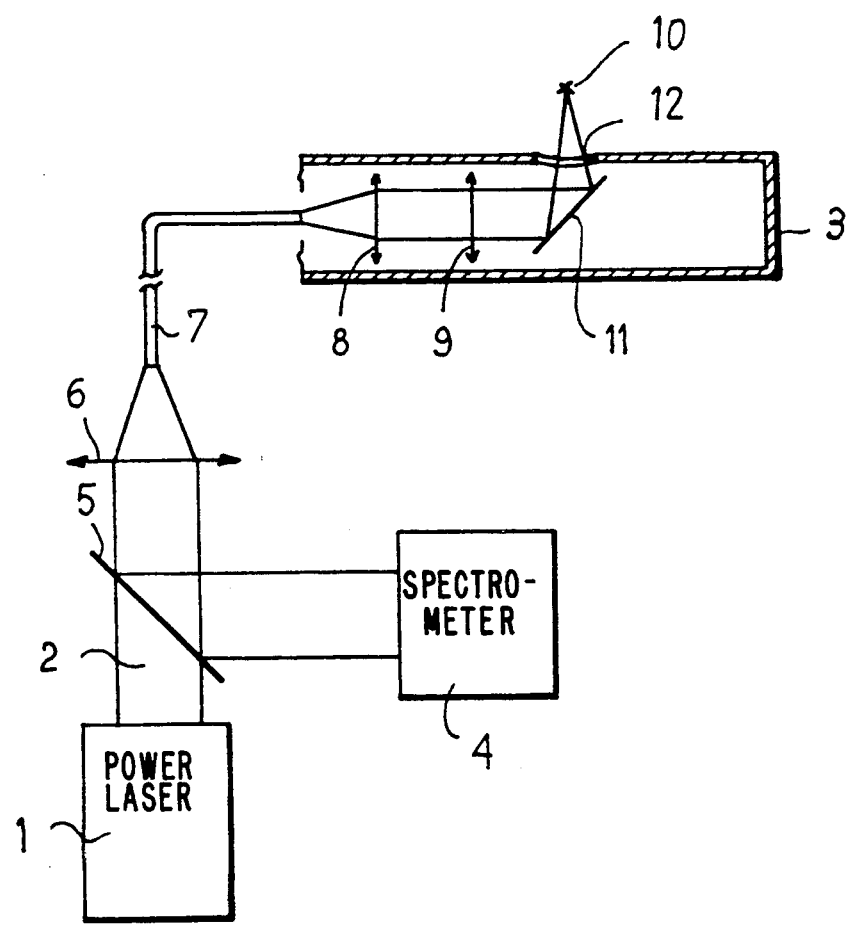

PROCESS AND DEVICE FOR LASER WORKING WITH REMOTE CONTROL

FIELD OF THE INVENTION

The present invention relates to laser welding in tubes of small diameter such as the steam generator tubes of pressurized water nuclear reactors.

BACKGROUND OF THE INVENTION

In certain laser workings, on such as welding within steam generator tubes, it is not possible to observe the working zone directly.

SUMMARY OF THE INVENTION

It is an object of the invention to provide a technique permitting the monitoring of the correct progress of the laser welding, in spite of this difficulty.

To this end, the subject of the invention is a process for laser welding in which a laser beam is carried to the vicinity of a working point, on which it is focused, and spectral analysis of the light emitted at the working point during the laser welding is carried out.

The analysis may be carried out continuously and/or in real time.

The subject of the invention is also a device for laser welding, which is intended for carrying out such a process. This device, of the type comprising a laser, means for conducting the laser beam and means for focusing the beam on a working point, comprises a dichroic mirror interposed in the path of the laser beam, which mirror is transparent to the laser beam and reflects other wavelengths, and a spectrometer receiving the light reflected by the mirror.

When said conducting means comprise an optical fiber, the dichroic mirror is mounted upstream of such optical fiber.

The spectrometer is adapted to filter the light rays emanating from the flash lamp of the laser;

The spectrometer is of the interferometer type.

BRIEF DESCRIPTION OF THE DRAWINGS

An illustrative embodiment of the invention will now be described with reference to the accompanying drawing, the single figure of which shows schematically a device for laser welding according to the invention.

DETAILED DESCRIPTION

The device shown in the drawing essentially comprises a power laser 1 of the YAG type, emitting a laser beam 2 of wavelength 1.06 micrometer, a working head 3 of cylindrical general form, and a spectrometer 4. This device is intended to carry out a circular weld within a tube of small diameter (not shown), for example for the purpose of fixing thereon an internal repair sleeve (not shown).

The laser beam passes through a dichroic mirror 5, inclined at 45°, which is transparent to he wavelength of the beam and reflecting for the other wavelength. It is then focused by a lens 6 onto the upstream end of an optical fiber 7, which conducts it into the head 3.

At the exit of the optical fiber, the beam is collimated by a lens 8, and then focused by a lens 9 onto the working point 10 (forming part of the wall of the tube in this example) after reflection on a mirror 11 inclined at 45° and passage through a lateral opening 12 of the working head.

In operation, the working point 10 emits a light during the welding. This light follows the path of the laser beam in the opposite direction, as far as the mirror 5, which reflects it towards the spectrometer 4, where it undergoes an analysis continuously and in real time.

If the welding is effective at the point 10, the spectrometer detects the ionization lines of the protective welding gas as well as the lines corresponding to the metal vapors of the base metal vaporized during welding, with certain amplitude ratios between these lines. By comparison with a standard spectrum corresponding to a satisfactory weld, it is thus possible to monitor in real time the correct progress of the welding.

It should be noted that, in certain cases the spectrometer may additionally receive a light spectrum originating from the flash lamps of the laser 1. In this case, this parasitic spectrum, which is stable and well reproducible, is stored in memory in the spectrometer, and is subtracted from the measured spectrum.

The mirror 5 must, of course, be chosen in such a manner as to reflect the entire light spectrum emitted by the point 10.

Preferably, the spectrometer employed is of the interferometer type.

The process described hereinabove may be employed for monitoring, in real time, any process of laser working including heat treatment, cutting, machining, cleaning, etc.

I claim:

1. Process for laser welding in which a laser beam (2) is carried to the vicinity of a working point (10) on which it is focused, said process comprising the steps of
   (a) drawing light emitted by said working point during the welding separately from the laser beam reflected by said working point; and
   (b) analyzing during welding a spectrum of drawn light by comparing said spectrum with a standard spectrum corresponding to a satisfactory weld.

2. Process according to claim 1, wherein said analysis is carried out continuously.

3. Process according to claim 1, wherein said analysis is carried out in real time.

4. Device for laser welding, of the type comprising a laser (1), means (7) for conducting a laser beam and mean (8, 9) for focusing said laser beam on a working point (10), said device further comprising a dichroic mirror (5) interposed in a path of said laser beam, said mirror being transparent to said laser beam and reflecting for other wavelengths, and a spectrometer (4) receiving light reflected by said mirror.

5. Device according to claim 4, wherein said conducting means (7) comprise an optical fiber downstream of said mirror (5).

6. Device according to claim 4, wherein said spectrometer (4) is adapted to filter light rays emanating from a flash lamp of said laser (1).

7. Device according to claim 4, wherein said spectrometer (4) is of the interferometer type.

* * * * *